United States Patent
Yu et al.

(10) Patent No.: US 10,320,660 B2
(45) Date of Patent: Jun. 11, 2019

(54) METHOD AND DEVICE FOR TRANSMITTING FORWARDING PARAMETER

(71) Applicant: Huawei Technologies Co., Ltd., Shenzhen (CN)

(72) Inventors: Guangxue Yu, Shenzhen (CN); Cheng Chen, Shenzhen (CN); Pengfei Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 272 days.

(21) Appl. No.: 15/449,862

(22) Filed: Mar. 3, 2017

(65) Prior Publication Data
US 2017/0187612 A1    Jun. 29, 2017

Related U.S. Application Data

(63) Continuation of application No. PCT/CN2015/088275, filed on Aug. 27, 2015.

(30) Foreign Application Priority Data

Sep. 5, 2014    (CN) .......................... 2014 1 0453369

(51) Int. Cl.
*H04L 12/721* (2013.01)
*H04L 12/741* (2013.01)
(Continued)

(52) U.S. Cl.
CPC .......... *H04L 45/38* (2013.01); *H04L 41/0823* (2013.01); *H04L 41/0886* (2013.01);
(Continued)

(58) Field of Classification Search
None
See application file for complete search history.

(56) References Cited

U.S. PATENT DOCUMENTS 8,897,134 B2 * 11/2014 Kern ...................... H04L 45/02
                                                    370/235
8,966,024 B2 *  2/2015 Koponen ............ H04L 41/0823
                                                    709/220
(Continued)

FOREIGN PATENT DOCUMENTS

CN    103347013 A    10/2013
CN    103581021 A     2/2014
(Continued)

OTHER PUBLICATIONS

"OpenFlow Switch Specification," Version 1.3.4 (Protocol version 0x04), pp. 1-171, Open Networking Foundation (Mar. 27, 2014).

(Continued)

*Primary Examiner* — Jamaal R Henson
(74) *Attorney, Agent, or Firm* — Leydig, Voit & Mayer, Ltd.

(57) ABSTRACT

Embodiments of the present invention disclose a method, an apparatus, and a system for transmitting a forwarding parameter. The method includes: obtaining, by a controller, an extended forwarding module description, where the extended forwarding module description includes a first format encoding rule, the first format encoding rule is used to indicate a type of a first forwarding parameter and a location of the first forwarding parameter in a first field, and the first field is a field in a flow entry of an OpenFlow protocol; and filling, by the controller, the first forwarding parameter in the first field according to the first format encoding rule, and sending, to a forwarding device by using the OpenFlow protocol, the flow entry that carries the first field, so that the forwarding device parses the first field in the flow entry according to the first format encoding rule, to obtain the first forwarding parameter.

20 Claims, 4 Drawing Sheets

A controller obtains an extended forwarding model description, the extended forwarding model description includes a first format encoding rule, the first format encoding rule is used to indicate a type of a first forwarding parameter and a location of the first forwarding parameter in a first field, and the first field is a field in a flow entry of an OpenFlow OpenFlow protocol — 101

The controller fills the first forwarding parameter in the first field according to the first format encoding rule, and sends, to a forwarding device by using the OpenFlow protocol, the flow entry that carries the first field, so that the forwarding device parses the first field in the flow entry according to the first format encoding rule, to obtain the first forwarding parameter — 102

(51) Int. Cl.
  H04L 29/06    (2006.01)
  H04L 12/715   (2013.01)
  H04L 29/08    (2006.01)
  H04L 12/24    (2006.01)

(52) U.S. Cl.
  CPC .............. H04L 45/64 (2013.01); H04L 45/74 (2013.01); H04L 67/327 (2013.01); H04L 69/22 (2013.01)

(56) References Cited

U.S. PATENT DOCUMENTS

| | | | | |
|---|---|---|---|---|
| 9,167,501 | B2* | 10/2015 | Kempf | ................ H04L 12/4633 |
| 9,246,833 | B2* | 1/2016 | Koponen | ............ G06F 9/45558 |
| 2005/0078704 | A1 | 4/2005 | Anderson et al. | |
| 2013/0163475 | A1* | 6/2013 | Beliveau | ............... H04L 67/327 |
| | | | | 370/257 |
| 2013/0272305 | A1 | 10/2013 | Lefebvre et al. | |
| 2014/0112190 | A1* | 4/2014 | Chou | ................... H04L 41/0226 |
| | | | | 370/254 |
| 2014/0233399 | A1* | 8/2014 | Mann | ................... H04L 41/0806 |
| | | | | 370/248 |
| 2014/0241346 | A1 | 8/2014 | Cohn et al. | |
| 2014/0241356 | A1* | 8/2014 | Zhang | ..................... H04L 45/38 |
| | | | | 370/392 |

FOREIGN PATENT DOCUMENTS

| | | |
|---|---|---|
| CN | 103718520 A | 4/2014 |
| CN | 103873464 A | 6/2014 |
| EP | 2869509 A1 | 5/2015 |
| WO | 2014082056 A1 | 5/2014 |
| WO | 2014085207 A1 | 6/2014 |

OTHER PUBLICATIONS

"OpenFlow Controller/Switch NDM Synchronization," v1.0, ONF TS-018, pp. 1-8, Open Networking Foundation (Aug. 15, 2014).

* cited by examiner

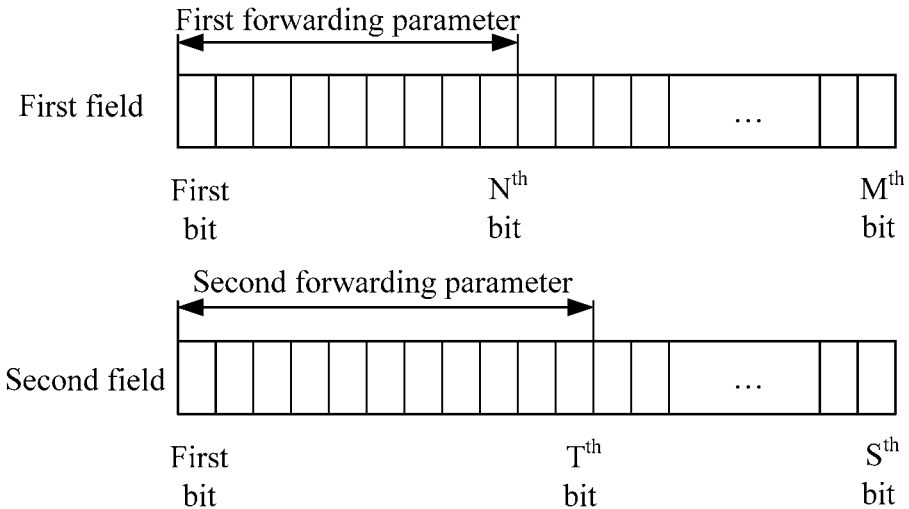

FIG. 2-3

```
┌─────────────────────────────────────────┐
│ A forwarding device obtains an extended │  ─ 301
│ forwarding model description, the       │
│ extended forwarding model description   │
│ includes a first format encoding rule,  │
│ the first format encoding rule is used  │
│ to indicate a type of a first forwarding│
│ parameter and a location of the first   │
│ forwarding parameter in a first field,  │
│ and the first field is a field in a flow│
│ entry of an OpenFlow OpenFlow protocol  │
└─────────────────────────────────────────┘
                    │
                    ▼
┌─────────────────────────────────────────┐
│ The forwarding device receives the flow │  ─ 302
│ entry, of the OpenFlow protocol, that   │
│ carries the first field and is sent by a│
│ controller, and parses the first field  │
│ according to the first format encoding  │
│ rule, to obtain the first forwarding    │
│ parameter                               │
└─────────────────────────────────────────┘
```

FIG. 3

METHOD AND DEVICE FOR TRANSMITTING FORWARDING PARAMETER

CROSS-REFERENCE TO RELATED APPLICATIONS

This application is a continuation of International Application No. PCT/CN2015/088275, filed on Aug. 27, 2015, which claims priority to Chinese Patent Application No. 201410453369.8, filed on Sep. 5, 2014. The disclosures of the aforementioned applications are hereby incorporated by reference in their entireties.

TECHNICAL FIELD

This application relates to the field of communications networks, and specifically, to a method, an apparatus, and a system for transmitting a forwarding parameter.

BACKGROUND

An SDN (Software Defined Networking) architecture based on an idea that control and forwarding are separated is a novel network switching model, which plays a favorable promotion role in network innovation and development, and key components of the SDN architecture include an OpenFlow switch and a controller. Message exchange and information transmission are completed between the controller and the OpenFlow switch through a control channel of an OpenFlow protocol specification. The controller implements management and control functions by using a network-wide view, to generate a forwarding flow table for the OpenFlow switch. The OpenFlow switch forwards a data packet according to the flow table, and a flow entry mainly includes match field(s) and instruction(s), and the like. However, live networks have been deployed with a large quantity of conventional forwarding devices, while the SDN/OpenFlow is an emerging network architecture and forwarding model after all. Therefore, how to be compatible with these conventional network forwarding devices in support of conventional forwarding models is a challenge SDN/OpenFlow confronts.

To be compatible with these network forwarding devices in support of conventional forwarding models, ONF (Open Networking Foundation) defines a NDM (Negotiable Datapath Model) and TTP (Table Typing Pattern) specification and description language, and the TTP is the first stage of the NDM in support of an existing OpenFlow protocol version, for example, OpenFlow-Switch 1.x. The NDM/TTP defines a frame. Based on the frame, vendors are allowed to define a variety of forwarding models on the basis of an actual application requirement and an existing chip architecture. Each model may relate to a plurality of tables, match different fields, and perform different actions based on search results. An existing chip is based on, where both matched fields and performed actions are limited. Therefore, the NDM/TTP describes a limited subset of a forwarding capability of the OpenFlow switch defined in the OpenFlow protocol specification.

To some extent, the NDM/TTP resolves a compatibility problem between the OpenFlow and the conventional forwarding models. However, when parameters required for existing forwarding logic and forwarding tables are forwarding parameters that are not defined in the OpenFlow protocol specification, the OpenFlow protocol requires to be extended to provide support in the prior art. A standard promotion requires to be performed for a long time, and whenever a new forwarding parameter that is not defined in the OpenFlow specification requires to be added, one or more corresponding standard promotions require to be performed. It is rather time-consuming, laborious, and complex to extend these forwarding parameters to the OpenFlow protocol specification, delaying and affecting a promotion and development speed of the SDN/OpenFlow technology to some extent.

SUMMARY

Embodiments of the present invention provide a method, an apparatus, and a system for transmitting a forwarding parameter. When a controller needs to transmit a forwarding parameter that is not defined in an OpenFlow protocol specification to a forwarding device in support of a conventional forwarding model on an SDN network, parameter transmission can be completed without the OpenFlow protocol extended, so that OpenFlow can be better compatible with the forwarding device in support of the conventional forwarding model on the network.

To resolve the foregoing problem, a first aspect of the embodiments of the present invention provides a method for transmitting a forwarding parameter by a controller, applied to a network on which control and forwarding are separated, where the network on which control and forwarding are separated includes the controller and a forwarding device, the controller controls the forwarding device, and the method includes: obtaining, by the controller, an extended forwarding model description, where the extended forwarding model description includes a first format encoding rule, the first format encoding rule is used to indicate a type of a first forwarding parameter and a location of the first forwarding parameter in a first field, and the first field is a field in a flow entry of an OpenFlow protocol; and filling, by the controller, the first forwarding parameter in the first field according to the first format encoding rule, and sending, to the forwarding device by using the OpenFlow protocol, the flow entry that carries the first field, so that the forwarding device parses the first field in the flow entry according to the first format encoding rule, to obtain the first forwarding parameter.

In a first possible implementation manner of the first aspect, the extended forwarding model description further includes a second format encoding rule, and the second format encoding rule is used to indicate a type of a second forwarding parameter and a location of the second forwarding parameter in the first field; and correspondingly, the method further includes: filling, by the controller, the second forwarding parameter in the first field according to the second format encoding rule, and sending, to the forwarding device by using the OpenFlow protocol, the flow entry that carries the first field, so that the forwarding device parses the first field in the flow entry according to the second format encoding rule, to obtain the second forwarding parameter.

In a second possible implementation manner of the first aspect, the method includes: the extended forwarding model description further includes a second format encoding rule, the second format encoding rule is used to indicate a type of a second forwarding parameter and a location of the second forwarding parameter in a second field, the second field is a field in a flow entry of the OpenFlow protocol, and the second field is different from the first field; and correspondingly, the method further includes: filling, by the controller, the second forwarding parameter in the second field according to the second format encoding rule, and sending, to the forwarding device by using the OpenFlow protocol, the flow entry that carries the second field, so that the forwarding device parses the second field in the flow entry according to the second format encoding rule, to obtain the second forwarding parameter.

With reference to any one of the first aspect or the first to the second possible implementation manners of the first aspect, in a third possible implementation manner of the first aspect, the first field is a MetaData field in the OpenFlow protocol.

With reference to any one of the first aspect or the first to the third possible implementation manners of the first aspect, in a fourth possible implementation manner of the first aspect, the method further includes: the first format encoding rule is generated according to an extended syntax of a forwarding model description language, and the extended syntax includes a field format encoding keyword, an encoding location keyword, and an encoding location information type keyword, where the field format encoding keyword is used to indicate a function of the extended syntax, the encoding location keyword is used to indicate a location for storing data in a field, and the encoding location information type keyword is used to indicate a type of the data.

With reference to the fourth possible implementation manner of the first aspect, in a fifth possible implementation manner of the first aspect, the type of the data is a virtual routing and forwarding instance identifier (VRFID), a next hop Internet Protocol (IP) address, an outbound interface or an entry index.

With reference to any one of the first aspect or the first to the fifth possible implementation manners of the first aspect, in a sixth possible implementation manner of the first aspect, the extended forwarding model description is stored in the controller and/or the forwarding device.

To resolve the foregoing problem, a second aspect of the embodiments of the present invention provides a method for transmitting a forwarding parameter by a forwarding device, applied to a network on which control and forwarding are separated, where the network on which control and forwarding are separated includes a controller and the forwarding device, the forwarding device is controlled by the controller, and the method includes: obtaining, by the forwarding device, an extended forwarding model description, where the extended forwarding model description includes a first format encoding rule, the first format encoding rule is used to indicate a type of a first forwarding parameter and a location of the first forwarding parameter in a first field, and the first field is a field in a flow entry of an OpenFlow protocol; and receiving, by the forwarding device, the flow entry, of the OpenFlow protocol, that carries the first field and is sent by the controller, and parsing the first field according to the first format encoding rule, to obtain the first forwarding parameter.

In a first possible implementation manner of the second aspect, the extended forwarding model description further includes a second format encoding rule, and the second format encoding rule is used to indicate a type of a second forwarding parameter and a location of the second forwarding parameter in the first field; and correspondingly, the method further includes: receiving, by the forwarding device, the flow entry, of the OpenFlow protocol, that carries the first field and is sent by the controller, and parsing the first field according to the second format encoding rule, to obtain the second forwarding parameter.

In a second possible implementation manner of the second aspect, the extended forwarding model description further includes a second format encoding rule, the second format encoding rule is used to indicate a type of a second forwarding parameter and a location of the second forwarding parameter in a second field, the second field is a field in a flow entry of the OpenFlow protocol, and the second field is different from the first field; and correspondingly, the method further includes: receiving, by the forwarding device, the flow entry, of the OpenFlow protocol, that carries the second field and is sent by the controller, and parsing the second field according to the second format encoding rule, to obtain the second forwarding parameter.

With reference to any one of the second aspect or the first to the second possible implementation manners of the second aspect, in a third possible implementation manner of the second aspect, the first field is a MetaData field in the OpenFlow protocol.

With reference to any one of the second aspect or the first to the third possible implementation manners of the second aspect, in a fourth possible implementation manner of the second aspect, the first format encoding rule is generated according to an extended syntax of a forwarding model description language, and the extended syntax includes a field format encoding keyword, an encoding location keyword, and an encoding location information type keyword, where the field format encoding keyword is used to indicate a function of the extended syntax, the encoding location keyword is used to indicate a location for storing data in a field, and the encoding location information type keyword is used to indicate a type of the data.

With reference to the fourth possible implementation manner of the second aspect, in a fifth possible implementation manner of the second aspect, the type of the data is a virtual routing and forwarding instance identifier (VRFID), a next hop IP address, an outbound interface or an entry index.

With reference to any one of the second aspect or the first to the fifth possible implementation manners of the second aspect, in a sixth possible implementation manner of the second aspect, the extended forwarding model description is stored in the controller and/or the forwarding device.

To resolve the foregoing problem, a third aspect of the embodiments of the present invention provides a controller, applied to a network on which control and forwarding are separated, where the network on which control and forwarding are separated includes the controller and a forwarding device, the controller controls the forwarding device, and the apparatus includes: an obtaining unit, configured to obtain an extended forwarding model description, where the extended forwarding model description includes a first format encoding rule, the first format encoding rule is used to indicate a type of a first forwarding parameter and a location of the first forwarding parameter in a first field, and the first field is a field in a flow entry of an OpenFlow protocol; and a sending unit, configured to: fill the first forwarding parameter in the first field according to the first format encoding rule, and send, to the forwarding device by using the OpenFlow protocol, the flow entry that carries the first field, so that the forwarding device parses the first field in the flow entry according to the first format encoding rule, to obtain the first forwarding parameter.

In a first possible implementation manner of the third aspect, the apparatus includes: the extended forwarding model description further includes a second format encoding rule, and the second format encoding rule is used to indicate a type of a second forwarding parameter and a location of the second forwarding parameter in the first field; the sending unit is further configured to: fill the second forwarding parameter in the first field according to the second format encoding rule, and send, to the forwarding device by using the OpenFlow protocol, the flow entry that carries the first field, so that the forwarding device parses the first field in the flow entry according to the second format encoding rule, to obtain the second forwarding parameter.

In a second possible implementation manner of the third aspect, the apparatus includes: the extended forwarding model description further includes a second format encoding rule, the second format encoding rule is used to indicate a type of a second forwarding parameter and a location of the second forwarding parameter in a second field, the second field is a field in a flow entry of the OpenFlow protocol, and the second field is different from the first field; the sending unit is further configured to: fill the second forwarding parameter in the second field according to the second format encoding rule, and send, to the forwarding device by using the OpenFlow protocol, the flow entry that carries the second field, so that the forwarding device parses the second field in the flow entry according to the second format encoding rule, to obtain the second forwarding parameter.

To resolve the foregoing problem, a fourth aspect of the embodiments of the present invention provides a forwarding device, applied to a network on which control and forwarding are separated, where the network on which control and forwarding are separated includes a controller and the forwarding device, the forwarding device is controlled by the controller, and the apparatus includes: an obtaining unit, configured to obtain an extended forwarding model description, where the extended forwarding model description includes a first format encoding rule, the first format encoding rule is used to indicate a type of a first forwarding parameter and a location of the first forwarding parameter in a first field, and the first field is a field in a flow entry of an OpenFlow protocol; and a receiving unit, configured to: receive the flow entry, of the OpenFlow protocol, that carries the first field and is sent by the controller, and parse the first field according to the first format encoding rule, to obtain the first forwarding parameter.

In a first possible implementation manner of the fourth aspect, the apparatus includes: the extended forwarding model description further includes a second format encoding rule, the second format encoding rule is used to indicate a type of a second forwarding parameter and a location of the second forwarding parameter in the first field, and the first field is the field in the flow entry of the OpenFlow protocol; and the receiving unit is further configured to: receive the flow entry, of the OpenFlow protocol, that carries the first field and is sent by the controller by the forwarding device, and parse the first field according to the second format encoding rule, to obtain the second forwarding parameter.

In a second possible implementation manner of the fourth aspect, the apparatus includes: the extended forwarding model description further includes a second format encoding rule, the second format encoding rule is used to indicate a type of a second forwarding parameter and a location of the second forwarding parameter in a second field, the second field is a field in a flow entry of the OpenFlow protocol, and the second field is different from the first field; and the sending unit is further configured to: fill the second forwarding parameter in the second field by the controller according to the second format encoding rule, and send, to the forwarding device by using the OpenFlow protocol, the flow entry that carries the second field, so that the forwarding device parses the second field in the flow entry according to the second format encoding rule, to obtain the second forwarding parameter.

To resolve the foregoing problem, a fifth aspect of the embodiments of the present invention provides a system for transmitting a forwarding parameter, applied to a network on which control and forwarding are separated, and the system includes a controller and a forwarding device; the controller includes any one of the controllers according to the third aspect, and the forwarding device includes any one of the forwarding devices according to the fourth aspect.

According to the embodiments of the present invention, in compliance with an OpenFlow protocol specification, by extending a forwarding model description language, a forwarding parameter required for a conventional forwarding device is added to a field of the OpenFlow protocol specification and is sent by a controller to the forwarding device, so that on the forwarding device, the field of the OpenFlow protocol specification is restored to the forwarding parameter required for the forwarding device. The present invention provides a method for transmitting a forwarding parameter simply and efficiently, so that OpenFlow can be better compatible with the conventional forwarding device on a network.

BRIEF DESCRIPTION OF DRAWINGS

FIG. 2-1 is a schematic diagram of first carrying of a forwarding parameter according to an embodiment of the present invention;

FIG. 2-2 is a schematic diagram of second carrying of a forwarding parameter according to an embodiment of the present invention;

FIG. 2-3 is a schematic diagram of third carrying of a forwarding parameter according to an embodiment of the present invention;

FIG. 3 is a schematic flowchart of a method for transmitting a forwarding parameter according to an embodiment of the present invention;

DESCRIPTION OF EMBODIMENTS

To make persons skilled in the art better understand the technical solutions of the present invention, the following further describes the embodiments of the present invention with reference to the accompanying drawings and implementation manners in detail. The described embodiments are some but not all of the embodiments of the present invention. All other embodiments obtained by persons of ordinary skill in the art based on the embodiments of the present invention without creative efforts shall fall within the protection scope of the present invention.

For specific details of an OpenFlow protocol specification described in the embodiments of the present invention, reference is made to "OpenFlow Switch Specification 1.x" published by ONF. For specific details of NDM/TTP, reference is made to the "OpenFlow Negotiable Datapath Models" specification published by ONF.

Embodiment 1

Solutions of this embodiment of the present invention relate to two sides: a controller and a forwarding device. The following describes, from the perspective of the controller first, a method for transmitting a forwarding parameter in this embodiment of the present invention.

Figure 1:
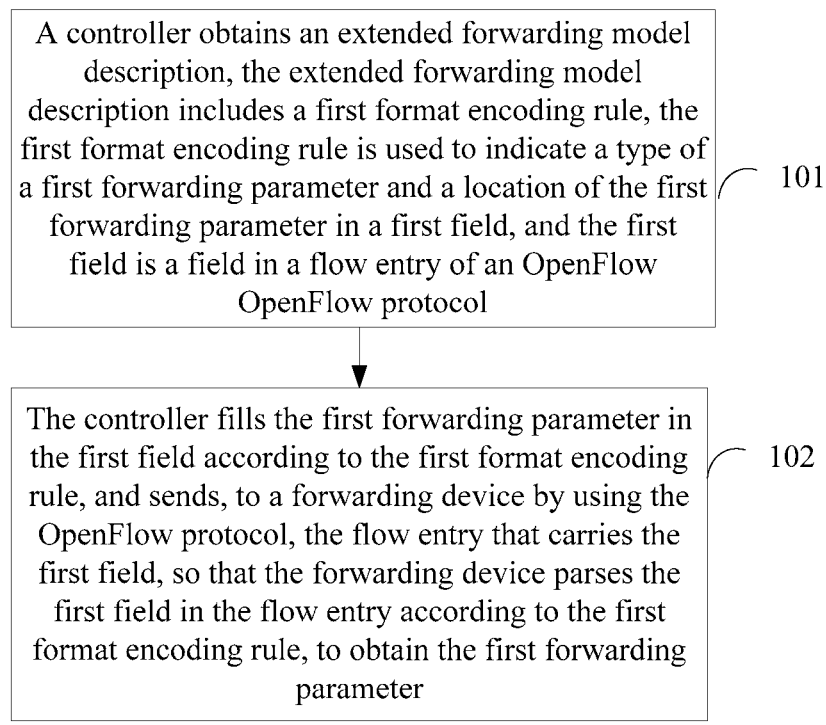
FIG. 1 is a schematic flowchart of a method for transmitting a forwarding parameter according to an embodiment of the present invention.

Referring to FIG. 1, FIG. 1 is a schematic flowchart of the method for transmitting a forwarding parameter by the controller according to this embodiment of the present invention. The method is applied to a network on which control and forwarding are separated, the network on which control and forwarding are separated includes the controller and the forwarding device, and the controller controls the forwarding device. The specific method may include the following steps:

Step 101: The controller obtains an extended forwarding model description, where the extended forwarding model description includes a first format encoding rule, the first format encoding rule is used to indicate a type of a first forwarding parameter and a location of the first forwarding parameter in a first field, and the first field is a field in a flow entry of an OpenFlow protocol.

Step 102: The controller fills the first forwarding parameter in the first field according to the first format encoding rule, and sends, to the forwarding device by using the OpenFlow protocol, the flow entry that carries the first field, so that the forwarding device parses the first field in the flow entry according to the first format encoding rule, to obtain the first forwarding parameter.

The forwarding model description is used to describe a forwarding capability and behavior of a specific forwarding device, for example, TTP or NDM defined by ONF describes a limited subset of a forwarding capability and behavior of an OpenFlow switch defined in an OpenFlow protocol specification. In compliance with a forwarding model description language, the forwarding model description is generated according to the forwarding capability of the forwarding device, for example, the forwarding model description may be generated artificially.

In this embodiment of the present invention, the forwarding model description language is extended by adding syntax for performing formatting encoding on a field, which may perform semantization on a field that has no semantic meaning and perform escaping on a field that has semantic meanings. The first format encoding rule is generated according to the extended formatting encoding syntax.

Optionally, the first format encoding rule is generated according to the extended syntax of the forwarding model description language, and the extended syntax includes a field format encoding (FldFmtEncd) keyword, an encoding location (FmtEncd_Location) keyword, and an encoding location information type (FmtEncd_Type) keyword, where the field format encoding keyword is used to indicate a function of the extended syntax, the encoding location keyword is used to indicate a location for storing data in a field, and the encoding location information type keyword is used to indicate a type of the data. The type of the data is a virtual routing and forwarding instance identifier (VRFID), a next hop IP address, an outbound interface, an entry index, or the like. Specifically, a variable may be defined by using the extended syntax, to describe a type of a parameter, and the variable is a specific value of the encoding location information type keyword. An example for describing the extended syntax is used as follows:

```
["FldFmtEncd" "FmtEncd_Location"|"FmtEncd_Type"]
"FmtEncd_Type" = variable;
variable = VRFID;
"FmtEncd Location" = number;
```

Figures 1, 2:
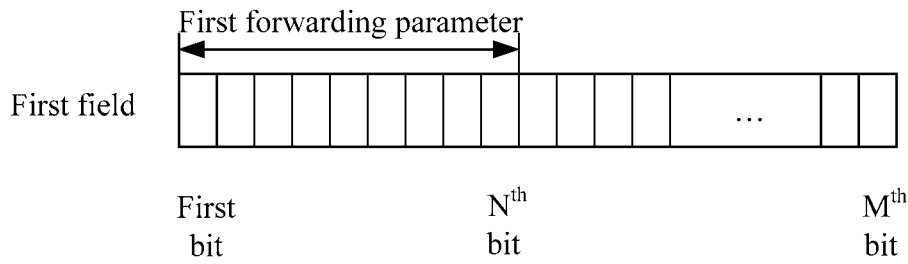
Figure 2:
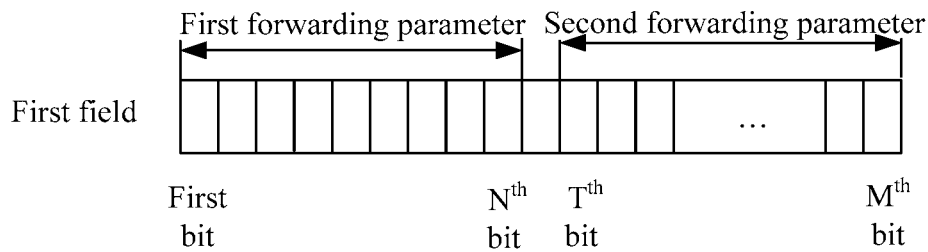

FIG. 2-1 schematically shows a manner in which the first forwarding parameter is carried in the first field according to the first format encoding rule. A length of the first field is M bits, a first bit to an $N^{th}$ bit indicate a location of the first forwarding parameter put into the first field, and $1<N<M$. For example, the first format encoding rule may be as follows (in this case, M=128, N=64, and a type of the first forwarding parameter is a virtual routing and forwarding instance identifier VRFID):

```
["FldFmtEncd"
{"FmtEncd_Location": "0xffff0000"|"FmtEncd_Type": "VRFID"}]
```

Preferably, the first field is a MetaData field in the OpenFlow protocol.

Optionally, the extended forwarding model description is stored in the controller and/or the forwarding device.

It should be noted that, in step 101, a manner in which the controller obtains the extended forwarding model description may be: dynamically obtaining the extended forwarding model description from the forwarding device through a control channel between the controller and the forwarding device, and storing the model description in the controller; or directly storing the model description in the controller by an administrator by means of artificial configuration; or when necessary, reading the forwarding model description in real time and dynamically from the forwarding device through a control channel between the controller and the forwarding device, instead of storing the model description in the controller.

After performing step 102, the forwarding device receives the flow entry that carries the first field. After receiving the flow entry, the forwarding device obtains the first field in the flow entry, and parses the first field in the flow entry according to the first format encoding rule, to obtain the first forwarding parameter. For example, a manner in which the forwarding device obtains the first format encoding rule may be: directly storing the extended forwarding model description including the first format encoding rule in the forwarding device by an administrator by means of artificial configuration, and obtaining the model description from the forwarding device; or dynamically obtaining the extended forwarding model description from the controller through a control channel between the controller and the forwarding device, and storing the model description in the forwarding device; or when necessary, obtaining the extended forwarding model description in real time and dynamically from the controller through a control channel between the controller and the forwarding device, instead of storing the model description in the forwarding device.

Further, optionally, if a second forwarding parameter also needs to be transmitted, the following manners may be used for implementation.

Manner 1: The extended forwarding model description further includes a second format encoding rule, and the second format encoding rule is used to indicate a type of the second forwarding parameter and a location of the second forwarding parameter in the first field. Correspondingly, the method further includes: filling, by the controller, the second forwarding parameter in the first field according to the second format encoding rule, and sending, to the forwarding device by using the OpenFlow protocol, the flow entry that carries the first field, so that the forwarding device parses the first field in the flow entry according to the second format encoding rule, to obtain the second forwarding parameter.

FIG. 2-2 schematically shows a manner in which the first forwarding parameter and the second forwarding parameter are carried in the first field according to the first format encoding rule and the second format encoding rule. A length of the first field is M bits, a first bit to an $N^{th}$ bit indicate a location of the first forwarding parameter put into the first field, and a $T^{th}$ bit to an $M^{th}$ bit indicate a location of the second forwarding parameter put into the first field, 1<N<T, and N<T<M. For example, the second format encoding rule may be as follows (in this case, M=128, N=64, T=65, and a type of the second forwarding parameter is a next hop IP address NextHopIPAddr):

["FldFmtEncd"
{"FmtEncd_Location": "0x0000ffff"|"FmtEncd_Type": "NextHopIPAddr"}]

It should be noted that, in manner 1, the controller sends, to the forwarding device by using the OpenFlow protocol, the flow entry that carries the first field. The specific sending method may be, for example, adding the first forwarding parameter and the second forwarding parameter to the first field in a flow entry at the same time, and then sending the flow entry to the forwarding device; or sending the first and the second forwarding parameters separately, for example, delivering the flow entry twice, where the first forwarding parameter is carried in the first field of the flow entry delivered for the first time, and the second forwarding parameter is carried in the first field of the flow entry delivered for the second time.

Manner 2: The extended forwarding model description further includes a second format encoding rule, the second format encoding rule is used to indicate a type of the second forwarding parameter and a location of the second forwarding parameter in a second field, the second field is a field in a flow entry of the OpenFlow protocol, and the second field is different from the first field. Correspondingly, the method further includes: filling, by the controller, the second forwarding parameter in the second field according to the second format encoding rule, and sending, to the forwarding device by using the OpenFlow protocol, the flow entry that carries the second field, so that the forwarding device parses the second field in the flow entry according to the second format encoding rule, to obtain the second forwarding parameter.

FIG. 2-3 schematically shows manners in which the first forwarding parameter is carried in the first field according to the first format encoding rule and the second forwarding parameter is carried in the second field according to the second format encoding rule. A length of the first field is M bits, and a first bit to an $N^{th}$ bit indicate a location of the first forwarding parameter put into the first field, and 1<N<M; a length of the second field is S bits, and a first bit to a $T^{th}$ bit indicate a location of the second forwarding parameter put into the second field, and 1<T<S. For example, the second format encoding rule may be as follows (in this case, S=128, T=64, and the type of the second forwarding parameter is a next hop IP address NextHopIPAddr):

["FldFmtEncd"
{"FmtEncd_Location": "0x ffff0000"|"FmtEncd_Type": "NextHopIPAddr"}]

It should be noted that, in this embodiment of the present invention, "first" in the first field and "second" in the second field are merely used to distinguish two fields, without limiting a sequence. "First" in the first format encoding rule and "second" in the second format encoding rule are merely used to distinguish two format encoding rules, without limiting a sequence. "First" in the first forwarding parameter and "second" in the second forwarding parameter are merely used to distinguish two forwarding parameters, without limiting a sequence.

It should be further noted that, all examples of this embodiment of the present invention are merely schematic illustrations, but are not limited to the formats and styles in the examples.

It should be additionally noted that, this embodiment of the present invention merely schematically illustrates a case of carrying and transmitting two forwarding parameters, and three or more forwarding parameters may be transmitted using the method in the present invention if desired.

According to Embodiment 1 of the present invention, in compliance with an OpenFlow protocol specification, by extending a forwarding model description language, a forwarding parameter required for a conventional forwarding device is added to a field of the OpenFlow protocol specification and is sent by a controller to the forwarding device, so that on the forwarding device, the field of the OpenFlow protocol specification is restored to the forwarding parameter required for the forwarding device. This embodiment of the present invention helps transmit the forwarding parameter simply and efficiently, so that OpenFlow can be better compatible with the conventional forwarding device on a network.

Embodiment 2

Corresponding to the foregoing method for transmitting a forwarding parameter by the controller, this embodiment of the present invention further provides a method for transmitting a forwarding parameter by a forwarding device, applied to a network on which control and forwarding are separated, where the network on which control and forwarding are separated includes the controller and the forwarding device, and the forwarding device is controlled by the controller. For the specific method, reference may be made to a schematic flowchart shown in FIG. 3. The method may include the following steps:

Step 301: The forwarding device obtains an extended forwarding model description, where the extended forwarding model description includes a first format encoding rule, the first format encoding rule is used to indicate a type of a first forwarding parameter and a location of the first forwarding parameter in a first field, and the first field is a field in a flow entry of an OpenFlow protocol.

Step 302: The forwarding device receives the flow entry, of the OpenFlow protocol, that carries the first field and is sent by the controller, and parses the first field according to the first format encoding rule, to obtain the first forwarding parameter.

For the extended forwarding model description, the first format encoding rule and an extended forwarding model description language for generating the first format encoding rule in this embodiment, reference is made to the corresponding description in Embodiment 1. Details are not described herein again.

FIG. 2-1 schematically shows a manner in which the first forwarding parameter is carried in the first field according to the first format encoding rule. Reference is made to the corresponding description in Embodiment 1. Details are not described herein again.

Preferably, the first field is a MetaData field in the OpenFlow protocol.

Optionally, the extended forwarding model description is stored in the controller and/or the forwarding device.

It should be noted that, in step 301, a manner in which the forwarding device obtains the extended forwarding model description may be: directly storing the extended forwarding model description including the first format encoding rule in the forwarding device by an administrator by means of artificial configuration; or dynamically obtaining the extended forwarding model description from the controller through a control channel between the controller and the forwarding device, and storing the model description in the forwarding device; or when necessary, reading the extended forwarding model description in real time and dynamically from the controller through a control channel between the controller and the forwarding device, instead of storing the model description in the forwarding device.

Further, optionally, if a second forwarding parameter also needs to be transmitted, the following manners may be used for implementation.

Manner 1: The extended forwarding model description further includes a second format encoding rule, and the second format encoding rule is used to indicate a type of the second forwarding parameter and a location of the second forwarding parameter in the first field. Correspondingly, the method further includes: receiving, the forwarding device, the flow entry, of the OpenFlow protocol, that carries the first field and is sent by the controller, and parsing the first field according to the second format encoding rule, to obtain the second forwarding parameter.

FIG. 2-2 schematically shows a manner in which the first forwarding parameter and the second forwarding parameter are carried in the first field according to the first format encoding rule and the second format encoding rule. Reference is made to the corresponding description in Embodiment 1. Details are not described herein again.

It should be noted that, in manner 1, the forwarding device receives the flow entry, of the OpenFlow protocol, that carries the first field and is sent by the controller. The specific receiving method may be: receiving a flow entry once, where the first field in the flow entry carries the first forwarding parameter and the second forwarding parameter at the same time; or receiving the flow entry twice, where the first field including the first forwarding parameter is carried in the flow entry received for the first time, and the first field including the second forwarding parameter is carried in the flow entry received for the second time.

Manner 2: The extended forwarding model description further includes a second format encoding rule, the second format encoding rule is used to indicate a type of the second forwarding parameter and a location of the second forwarding parameter in a second field, the second field is a field in a flow entry of the OpenFlow protocol, and the second field is different from the first field. Correspondingly, the method further includes: receiving, by the forwarding device, the flow entry, of the OpenFlow protocol, that carries the second field and is sent by the controller, and parsing the second field according to the second format encoding rule, to obtain the second forwarding parameter.

FIG. 2-3 schematically shows manners in which the first forwarding parameter is carried in the first field according to the first format encoding rule and the second forwarding parameter is carried in the second field according to the second format encoding rule. Reference is made to the corresponding description in Embodiment 1. Details are not described herein again.

It should be noted that, in this embodiment of the present invention, "first" in the first field and "second" in the second field are merely used to distinguish two fields, without limiting a sequence. "First" in the first format encoding rule and "second" in the second format encoding rule are merely used to distinguish two format encoding rules, without limiting a sequence. "First" in the first forwarding parameter and "second" in the second forwarding parameter are merely used to distinguish two forwarding parameters, without limiting a sequence.

It should be further noted that, all examples of this embodiment of the present invention are merely schematic illustrations, but are not limited to formats and styles in the examples.

It should be additionally noted that, this embodiment of the present invention merely schematically illustrates a case of carrying and transmitting two forwarding parameters, and three or more forwarding parameters may be transmitted using the method in the present invention if desired.

According to Embodiment 2 of the present invention, by extending a forwarding model description language, a field, of an OpenFlow protocol specification, that carries a forwarding parameter required for a conventional forwarding device and is sent by the controller is received from the forwarding device, and the field of the OpenFlow protocol specification is restored to the forwarding parameter required for the forwarding device. This embodiment of the present invention helps transmit the forwarding parameter simply and efficiently, so that OpenFlow can be better compatible with the conventional forwarding device on a network.

Embodiment 3

Figure 4:
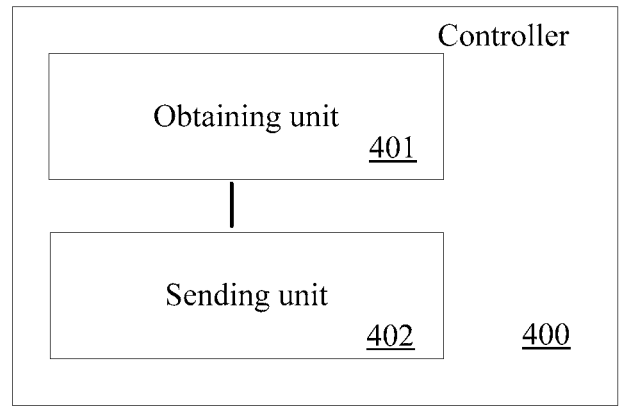
FIG. 4 is a schematic structural diagram of a controller according to an embodiment of the present invention.

Referring to FIG. 4, an embodiment of the present invention provides a controller 400. The controller 400 controls a forwarding device, applied to a network on which control and forwarding are separated, and the controller 400 includes:

an obtaining unit 401, configured to obtain an extended forwarding model description, where the extended forwarding model description includes a first format encoding rule, the first format encoding rule is used to indicate a type of a first forwarding parameter and a location of the first forwarding parameter in a first field, and the first field is a field in a flow entry of an OpenFlow protocol; and a sending unit 402, configured to: fill the first forwarding parameter in the first field according to the first format encoding rule, and send, to the forwarding device by using the OpenFlow protocol, the flow entry that carries the first field, so that the forwarding device parses the first field in the flow entry according to the first format encoding rule, to obtain the first forwarding parameter.

Further, optionally, if a second forwarding parameter also needs to be transmitted, an optional implementation is as follows:

the extended forwarding model description further includes a second format encoding rule, and the second format encoding rule is used to indicate a type of the second forwarding parameter and a location of the second forwarding parameter in the first field.

Accordingly, the sending unit 402 is further configured to: fill the second forwarding parameter in the first field according to the second format encoding rule, and send, to the forwarding device by using the OpenFlow protocol, the flow entry that carries the first field, so that the forwarding device parses the first field in the flow entry according to the second format encoding rule, to obtain the second forwarding parameter.

Further, optionally, if the second forwarding parameter also needs to be transmitted, another optional implementation is as follows:

the extended forwarding model description further includes a second format encoding rule, the second format encoding rule is used to indicate a type of the second forwarding parameter and a location of the second forwarding parameter in a second field, the second field is a field in a flow entry of the OpenFlow protocol, and the second field is different from the first field.

Accordingly, the sending unit 402 is further configured to: fill the second forwarding parameter in the second field according to the second format encoding rule, and send, to the forwarding device by using the OpenFlow protocol, the flow entry that carries the second field, so that the forwarding device parses the second field in the flow entry according to the second format encoding rule, to obtain the second forwarding parameter.

It should be noted that, each functional unit of the control controller provided in Embodiment 3 of the present invention is a specific implementation based on the method provided in Embodiment 1, and definitions of terminologies and resolved problems are consistent with those of Embodiment 1. Details are not described herein again.

The controller provided in Embodiment 3 of the present invention obtains an extended forwarding model description by using an obtaining unit, the extended forwarding model description includes a first format encoding rule, the first format encoding rule is used to indicate a type of a first forwarding parameter and a location of the first forwarding parameter in a first field, and the first field is a field in a flow entry of an OpenFlow protocol. The controller fills the first forwarding parameter in the first field according to the first format encoding rule by using a sending unit, and sends, to a forwarding device by using the OpenFlow protocol, the flow entry that carries the first field, so that the forwarding device parses the first field in the flow entry according to the first format encoding rule, to obtain the first forwarding parameter. This embodiment of the present invention helps transmit the forwarding parameter simply and efficiently, so that OpenFlow can be better compatible with the conventional forwarding device on a network.

Embodiment 4

Figure 5:
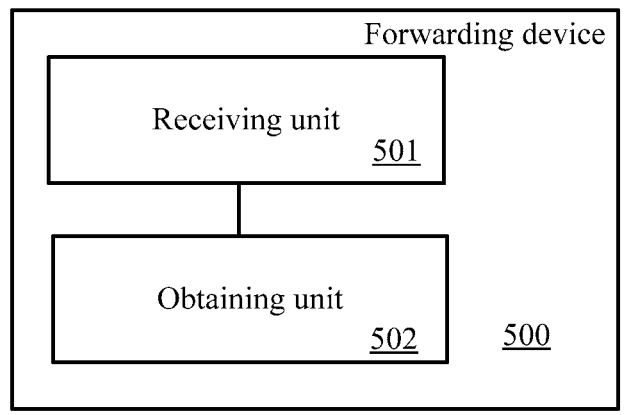
FIG. 5 is a schematic structural diagram of a forwarding device according to an embodiment of the present invention.

Referring to FIG. 5, an embodiment of the present invention provides a forwarding device 500. The forwarding device 500 is controlled by a controller, applied to a network on which control and forwarding are separated, and the forwarding device 500 includes:

an obtaining unit 502, configured to obtain an extended forwarding model description, where the extended forwarding model description includes a first format encoding rule, the first format encoding rule is used to indicate a type of a first forwarding parameter and a location of the first forwarding parameter in a first field, and the first field is a field in a flow entry of an OpenFlow protocol; and a receiving unit 501, configured to: receive the flow entry, of the OpenFlow protocol, that carries the first field and is sent by the controller, and parse the first field according to the first format encoding rule, to obtain the first forwarding parameter.

Further, optionally, if a second forwarding parameter also needs to be transmitted, an optional implementation is as follows:

the extended forwarding model description further includes a second format encoding rule, and the second format encoding rule is used to indicate a type of the second forwarding parameter and a location of the second forwarding parameter in the first field.

Accordingly, the receiving unit 501 is further configured to: receive the flow entry, of the OpenFlow protocol, that carries the first field and is sent by the controller, and parse the first field according to the second format encoding rule, to obtain the second forwarding parameter.

Further, optionally, if the second forwarding parameter also needs to be transmitted, another optional implementation is as follows:

the extended forwarding model description further includes a second format encoding rule, the second format encoding rule is used to indicate a type of the second forwarding parameter and a location of the second forwarding parameter in a second field, the second field is a field in a flow entry of the OpenFlow protocol, and the second field is different from the first field.

The receiving unit 501 is further configured to: receive the flow entry, of the OpenFlow protocol, that carries the second field and is sent by the controller, and parse the second field according to the second format encoding rule, to obtain the second forwarding parameter.

It should be noted that, each functional unit of the forwarding device provided in Embodiment 4 of the present invention is a specific implementation based on the method provided in Embodiment 2, and definitions of terminologies and resolved problems are consistent with those of Embodiment 2. Details are not described herein again.

The forwarding device provided in Embodiment 4 of the present invention obtains an extended forwarding model description by using an obtaining unit, the extended forwarding model description includes a first format encoding rule, the first format encoding rule is used to indicate a type of a first forwarding parameter and a location of the first forwarding parameter in a first field, and the first field is a field in a flow entry of an OpenFlow protocol. The forwarding device receives the flow entry, of the OpenFlow protocol, that carries the first field and is sent by a controller by using a receiving unit, and parses the first field according to the first format encoding rule, to obtain the first forwarding parameter. This embodiment of the present invention helps transmit the forwarding parameter simply and efficiently, so that OpenFlow can be better compatible with the conventional forwarding device on a network.

Embodiment 5

Figure 6:
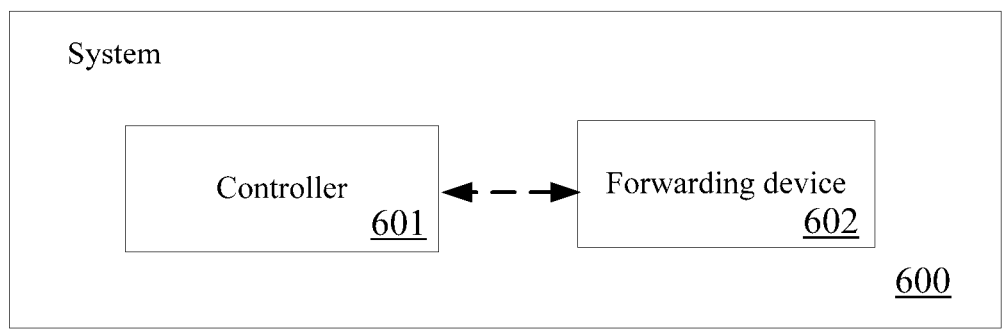
FIG. 6 is a schematic structural diagram of a system for transmitting a forwarding parameter according to an embodiment of the present invention.

Referring to FIG. 6, an embodiment of the present invention provides a system for transmitting a forwarding parameter. The system is applied to a network on which control and forwarding are separated and includes: a controller 601 and a forwarding device 602, where the controller 601 includes:
the controller in Embodiment 3; and
the forwarding device 602 includes:

the forwarding device in Embodiment 4.

It should be noted that, each functional unit of the controller and the forwarding device that are provided in Embodiment 5 of the present invention is a specific implementation based on the methods provided in Embodiments 1 and 2 and a combination of the apparatuses in Embodiments 3 and 4, and definitions of terminologies and resolved problems are consistent with those of Embodiments 1 to 4. Details are not described herein again.

By combining the controller described in Embodiment 3 and the forwarding device described in Embodiment 4, in compliance with an OpenFlow protocol specification, the system provided in Embodiment 5 of the present invention adds a forwarding parameter required for the conventional forwarding device to a field of the OpenFlow protocol specification, and sends the forwarding parameter from the controller to the forwarding device, so that on the forwarding device, the field of the OpenFlow protocol specification is restored to the forwarding parameter required for the forwarding device. This embodiment of the present invention helps transmit the forwarding parameter simply and efficiently, so that OpenFlow can be better compatible with the conventional forwarding device on a network.

Embodiment 6

Figure 7:
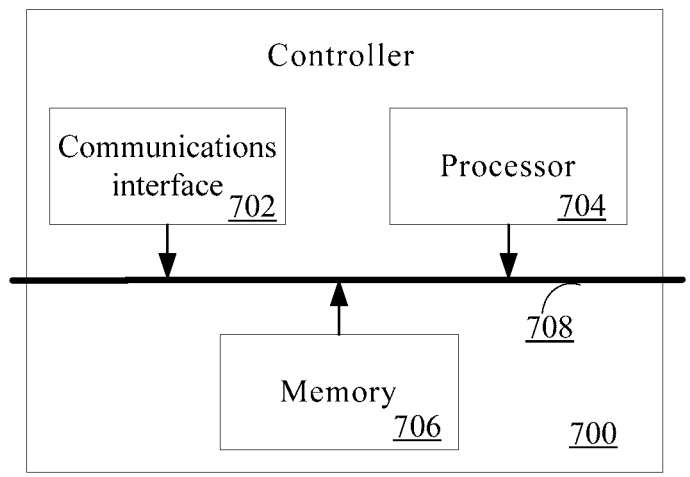
FIG. 7 is a schematic structural diagram of a controller according to an embodiment of the present invention.

Referring to FIG. 7, an embodiment of the present invention provides a control device 700. The device may be embedded in a micro processing computer or is a micro processing computer, for example, a general-purpose computer, a customized computer, a mobile phone terminal, a tablet, or other portable devices. The control device 700 includes: at least one processor 704, a memory 706, a communications interface 702, and a bus 708. The processor 704, the memory 706, and the communications interface 702 are connected and communicate with each other by using the bus 708.

The bus 708 may be an Industry Standard Architecture (ISA) bus, a Peripheral Component Interconnect (PCI) bus, an Extended Industry Standard Architecture (EISA) bus, or the like. The bus may be divided into an address bus, a data bus, a control bus, and the like. For ease of representation, the bus is represented only by a heavy line in FIG. 7, but it does not mean that there is only one bus or one type of bus.

The memory 706 is configured to store executable program code, and the program code includes a computer operation instruction. The memory 706 may include a high-speed random access memory (RAM) memory, and may also include a non-volatile memory, for example, at least one magnetic disk memory.

The processor 704 may be a central processing unit (CPU), an application-specific integrated circuit (ASIC), or configured to be one or more integrated circuits for implementing this embodiment of the present invention.

The communications interface 702 is configured to perform an operation of sending, to the forwarding device by the controller by using the OpenFlow protocol, the flow entry that carries the first field and/or obtaining the extended forwarding model description in Embodiment 3.

Optionally, the communications interface 702 is further configured to perform an operation of sending, to the forwarding device by the controller by using the OpenFlow protocol, the flow entry that carries the second field in Embodiment 3.

The memory 706 is configured to store an instruction.

The processor 704 is configured to read the instruction stored in the memory 706, so as to perform an operation of filling the first forwarding parameter in the first field by the controller according to the first format encoding rule in Embodiment 3.

Optionally, the processor 704 further performs filling the second forwarding parameter in the first field according to the second format encoding rule.

Optionally, the processor 704 further performs filling the second forwarding parameter in the second field according to the second format encoding rule.

Embodiment 7

Figure 8:
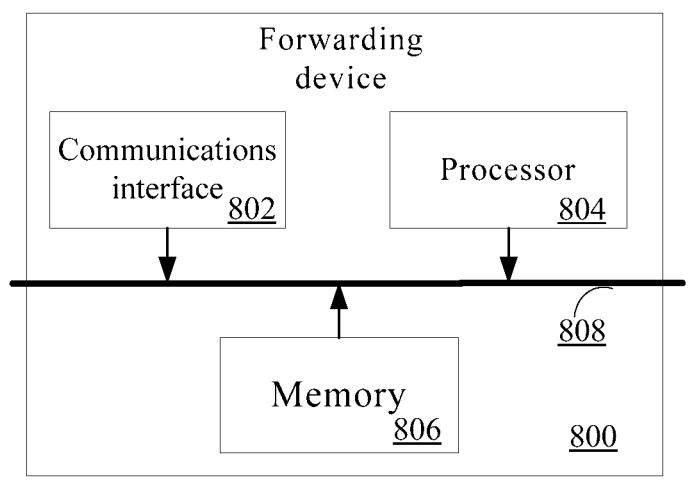
FIG. 8 is a schematic structural diagram of a forwarding device according to an embodiment of the present invention.

Referring to FIG. 8, an embodiment of the present invention provides a forwarding device 800. The device may be embedded in a micro processing computer or is a micro processing computer, for example, a general-purpose computer, a customized computer, a mobile phone terminal, a tablet, or other portable devices. The forwarding device 800 includes: at least one processor 804, a memory 806, a communications interface 802, and a bus 808. The processor 804, the memory 806, and the communications interface 802 are connected and communicate with each other by using the bus 808.

The bus 808 may be an Industry Standard Architecture (ISA) bus, a Peripheral Component Interconnect (PCI) bus, an Extended Industry Standard Architecture (EISA) bus, or the like. The bus may be divided into an address bus, a data bus, a control bus, and the like. For ease of representation, the bus is represented only by a heavy line in FIG. 8, but it does not mean that there is only one bus or one type of buses.

The memory 806 is configured to store executable program code, and the program code includes a computer operation instruction. The memory 806 may include a high-speed RAM memory, and may also include a non-volatile memory, for example, at least one magnetic disk memory.

The processor 804 may be a central processing unit (CPU), an application-specific integrated circuit (ASIC), or configured to be one or more integrated circuits for implementing this embodiment of the present invention.

The processor 804 may be a central processing unit (CPU), an application-specific integrated circuit (ASIC), or configured to be one or more integrated circuits for implementing this embodiment of the present invention.

The communications interface 802 is configured to perform an operation of receiving the flow entry, of the OpenFlow protocol, that carries the first field and is sent by the controller and/or obtaining the extended forwarding model description in Embodiment 4.

Optionally, the communications interface 802 is further configured to perform an operation of receiving the flow entry, of the OpenFlow protocol, that carries the second field and is sent by the controller in Embodiment 4.

The memory 806 is configured to store a forwarding entry saved in a saving unit 520 in FIG. 5.

Optionally, the memory 806 is further configured to store an instruction.

The processor 804 is configured to read the forwarding entry and the instruction that are stored in the memory 806, so as to perform an operation of parsing the first field according to the first format encoding rule, to obtain the first forwarding parameter in Embodiment 4.

Optionally, the processor 804 further performs an operation of parsing the first field according to the second format encoding rule, to obtain the second forwarding parameter in Embodiment 4.

Optionally, the processor 804 further performs an operation of parsing the second field according to the second format encoding rule, to obtain the second forwarding parameter in Embodiment 4.

Persons of ordinary skill in the art may understand that all or some of the steps in the foregoing method embodiments may be implemented by a computer program instructing relevant hardware. The program may be stored in a computer readable storage medium. When the program is executed, the steps included in the foregoing method embodiments are executed. The storage medium may be any medium that can store program code, such as a ROM (Read-Only Memory), a RAM, a magnetic disk, an optical disk, or the like.

Finally, it should be noted that the foregoing embodiments are merely intended to describe the technical solutions of the present invention, but not to limit the present invention. Although the present invention and the beneficial effects of the present invention are described in detail with reference to the foregoing embodiments, persons of ordinary skill in the art should understand that they may still make modifications to the technical solutions described in the foregoing embodiments, or make equivalent replacements to some technical features thereof, without making the nature of the corresponding technical solutions depart from the scope of the claims of the present invention. Additionally, statements made herein characterizing the invention refer to an embodiment of the invention and not necessarily all embodiments.

What is claimed is:

1. A method for transmitting a forwarding parameter, applied to a network for which control and forwarding are separated, wherein the network comprises a controller and a forwarding device, the controller controls the forwarding device, and the method comprises:
    obtaining, by the controller, an extended forwarding model description, wherein the extended forwarding model description comprises a first format encoding rule for indicating a type of a first forwarding parameter and a location of the first forwarding parameter in a first field, wherein the first field is an Open Flow protocol flow entry field; and
    filling, by the controller, the first forwarding parameter in the first field according to the first format encoding rule, and sending, to the forwarding device by using the OpenFlow protocol, the flow entry that carries the first field to facilitate the forwarding device parsing the first field according to the first format encoding rule to obtain the first forwarding parameter.

2. The method according to claim 1, wherein the extended forwarding model description further comprises a second format encoding rule for indicating a type of a second forwarding parameter and a location of the second forwarding parameter in the first field;
    wherein the method further comprises: filling, by the controller, the second forwarding parameter in the first field according to the second format encoding rule; and
    wherein sending, to the forwarding device by using the OpenFlow protocol, the flow entry that carries the first field further facilitates parsing the first field according to the second format encoding rule to obtain the second forwarding parameter.

3. The method according to claim 1, wherein the extended forwarding model description further comprises a second format encoding rule for indicating a type of a second forwarding parameter and a location of the second forwarding parameter in a second field, wherein the second field is an OpenFlow protocol flow entry field, and the second field is different from the first field; and
    wherein the method further comprises: filling, by the controller, the second forwarding parameter in the second field according to the second format encoding rule, and sending, to the forwarding device by using the OpenFlow protocol, the flow entry that carries the second field to facilitate the forwarding device parsing the second field according to the second format encoding rule, to obtain the second forwarding parameter.

4. The method according to claim 1, wherein the first field is a MetaData field in the OpenFlow protocol.

5. The method according to claim 1, wherein the first format encoding rule is generated according to an extended syntax of a forwarding model description language, and the extended syntax comprises a field format encoding keyword, an encoding location keyword, and an encoding location information type keyword, wherein the field format encoding keyword is used to indicate a function of the extended syntax, the encoding location keyword is used to indicate a location for storing data in a field, and the encoding location information type keyword is used to indicate a type of the data.

6. The method according to claim 5, wherein the type of the data is one of the following: a virtual routing and forwarding instance identifier (VRFID), a next hop Internet Protocol (IP) address, an outbound interface, or an entry index.

7. A method for transmitting a forwarding parameter, applied to a network for which control and forwarding are separated, wherein the network comprises a controller and a forwarding device, the forwarding device is controlled by the controller, and the method comprises:
    obtaining, by the forwarding device, an extended forwarding model description, wherein the extended forwarding model description comprises a first format encoding rule for indicating a type of a first forwarding parameter and a location of the first forwarding parameter in a first field, wherein the first field is an OpenFlow protocol flow entry field; and
    receiving, by the forwarding device, from the controller, the flow entry that carries the first field, and parsing the first field according to the first format encoding rule to obtain the first forwarding parameter.

8. The method according to claim 7, wherein the extended forwarding model description further comprises a second format encoding rule for indicating a type of a second forwarding parameter and a location of the second forwarding parameter in the first field; and
    wherein the method further comprises: parsing the first field according to the second format encoding rule, to obtain the second forwarding parameter.

9. The method according to claim 7, wherein the extended forwarding model description further comprises a second format encoding rule for indicating a type of a second forwarding parameter and a location of the second forwarding parameter in a second field, wherein the second field is an OpenFlow protocol flow entry field, and the second field is different from the first field; and
    wherein the method further comprises: receiving, by the forwarding device, from the controller, the flow entry that carries the second field, and parsing the second field according to the second format encoding rule to obtain the second forwarding parameter.

10. The method according to claim 7, wherein the first field is a MetaData field in the OpenFlow protocol.

11. The method according to claim 7, wherein the first format encoding rule is generated according to an extended syntax of a forwarding model description language, and the extended syntax comprises a field formal encoding keyword, an encoding location keyword, and an encoding location information type keyword, wherein the field format encoding keyword is used to indicate a function of the extended syntax, the encoding location keyword is used to indicate a location for storing data in a field, and the encoding location information type keyword is used to indicate a type of the data.

12. The method according to claim 11, wherein the type of the data is one of the following: a virtual routing and forwarding instance identifier (VRFID), a next hop Internet Protocol (IP) address, an outbound interface, or and an entry index.

13. The method according to claim 7, wherein the extended forwarding model description is stored in the controller and/or the forwarding device.

14. A controller for controlling a forwarding device, wherein control and forwarding are separated for a network comprising the controller and the forwarding device, and wherein the controller comprises a processor and a non-transitory computer-readable medium having processor-executable instructions stored thereon, the processor-executable instructions, when executed by the processor, facilitating the following:
 obtaining an extended forwarding model description, wherein the extended forwarding model description comprises a first format encoding rule for indicating a type of a first forwarding parameter and a location of the first forwarding parameter in a first field, wherein the first field is an OpenFlow protocol flow entry field; and
 filing the first forwarding parameter in the first field according to the first format encoding rule, and sending to the forwarding device by using the OpenFlow protocol, the flow entry that carries the first field to facilitate the forwarding device parsing the first field according to the first format encoding rule to obtain the first forwarding parameter.

15. The controller according to claim 14, wherein the extended forwarding model description further comprises a second format encoding rule for indicating a type of a second forwarding parameter and a location of the second forwarding parameter in the first field;
 wherein the processor-executable instruction, when executed by the processor, further facilitate: filing the second forwarding parameter in the first field according to the second format encoding rule; and
 wherein sending, to the forwarding device by using the OpenFlow protocol, the flow entry that carries the first field further facilitates parsing the first field according to the second format encoding rule to obtain the second forwarding parameter.

16. The controller according to claim 14. wherein the extended forwarding model description further comprises a second format encoding rule for indicating a type of a second forwarding parameter and a location of the second forwarding parameter in a second field, wherein the second field is an OpenFlow protocol flow entry field, and the second field is different from the first field; and
 wherein the processor-executable instructions, when executed by the processor, further facilitate: filing the second forwarding parameter in the second field according to the second format encoding rule, and sending, to the forwarding device by using the Open-Flow protocol, the flow entry that carries the second field to facilitate the forwarding device parsing the second field according to the second format encoding rule to obtain the second forwarding parameter.

17. A forwarding device by a controller, wherein control and forwarding are separated for a network comprising the controller and the forwarding device, and wherein the forwarding device comprises a processor and a non-transitory computer-readable medium having processor-executable instructions stored thereon, the processor-executable instructions, when executed by the processor, facilitating the following:
 obtaining an extended forwarding model description, wherein the extended forwarding model description comprises a first format encoding rule for indicating a type of a first forwarding parameter and a location of the first forwarding parameter in a first field, wherein the first field is an OpenFlow protocol flow entry field; and
 receiving, from the controller, the flow entry that carries the first field, and parsing the first field according to the first format encoding rule to obtain the first forwarding parameter.

18. The forwarding device according to claim 17, wherein the extended forwarding model description further comprises a second format encoding rule for indicating a type of a second forwarding parameter and a location of the second forwarding parameter in the first field; and
 wherein the processor-executable instructions, when executed by the processor, further facilitate parsing: the first field according to the second format encoding rule to obtain the second forwarding parameter.

19. The forwarding device according to claim 17, wherein the extended forwarding model description further comprises a second format encoding rule for indicating a type of a second forwarding parameter and a location of the second forwarding parameter in a second field, wherein the second field is an OpenFlow protocol flow entry field, and the second field is different from the first field; and
 wherein the processor-executable instructions, when executed by the processor, further facilitate: receiving, from the controller, the flow entry that carries the second field and parsing the second field according to the second format encoding rule to obtain the second forwarding parameter.

20. A system for transmitting a forwarding parameter for a network for which control and forwarding are separated, wherein the system comprises:
 a controller; and
 a forwarding device;
 wherein the network comprises the controller and the forwarding device;
 wherein the controller is configured to control the forwarding device;
 wherein the controller is configured to:
  obtain an extended forwarding model description, wherein the extended forwarding model description comprises a first format encoding rule for indicating a type of a first forwarding parameter and a location of the first forwarding parameter in a first field, wherein the first field is an OpenFlow protocol flow entry field; and
  fill the first forwarding parameter in the first field according to the first format encoding rule, and send, to the forwarding device by using the OpenFlow protocol, the flow entry that carries the first field; and
 wherein the forwarding device is configured to:

obtain an extended forwarding model description; and
receive, from the controller, the flow entry that carries the first field, and parse the first field according to the first format encoding rule to obtain the first forwarding parameter.

\* \* \* \* \*

UNITED STATES PATENT AND TRADEMARK OFFICE
CERTIFICATE OF CORRECTION

PATENT NO. : 10,320,660 B2  
APPLICATION NO. : 15/449862  
DATED : June 11, 2019  
INVENTOR(S) : Yu et al.

It is certified that error appears in the above-identified patent and that said Letters Patent is hereby corrected as shown below:

In the Claims

Claim 1, Column 17, Line 41: "Open Flow" should read -- OpenFlow --.

Claim 11, Column 19, Line 4: "formal" should read -- format --.

Claim 12, Column 19, Line 15: "or and an entry" should read -- or an entry --.

Claim 14, Column 19, Line 35: "filing" should read -- filling --.

Claim 15, Column 19, Line 47: "processor-executable instruction" should read -- processor-executable instructions --.

Claim 15, Column 19, Line 48: "filing" should read -- filling --.

Claim 16, Column 19, Line 64: "filing" should read -- filling --.

Claim 17, Column 20, Line 5: "device by a controller" should read -- device controlled by a controller --.

Claim 20, Column 21, Line 1: "an extended forwarding model" should read -- the extended forwarding model --.

Signed and Sealed this  
Twenty-fifth Day of February, 2020

Andrei Iancu  
*Director of the United States Patent and Trademark Office*